(12) United States Patent
Hill

(10) Patent No.: US 8,251,452 B2
(45) Date of Patent: Aug. 28, 2012

(54) GAMING CHAIRS

(76) Inventor: Jason D. Hill, Portland, OR (US)

( * ) Notice: Subject to any disclaimer, the term of this patent is extended or adjusted under 35 U.S.C. 154(b) by 424 days.

(21) Appl. No.: 12/618,573

(22) Filed: Nov. 13, 2009

(65) Prior Publication Data

US 2011/0115262 A1    May 19, 2011

(51) Int. Cl.
A47C 7/50    (2006.01)
(52) U.S. Cl. .................. 297/380; 297/68; 297/423.19
(58) Field of Classification Search .................. 297/19, 297/68, 90, 91, 174 R, 217.3, 380, 423.1, 297/423.19
See application file for complete search history.

(56) References Cited

U.S. PATENT DOCUMENTS

| | | | | |
|---|---|---|---|---|
| 5,054,771 | A | * | 10/1991 | Mansfield ................ 463/36 |
| 5,839,783 | A | * | 11/1998 | Black ................... 297/380 |
| 5,911,634 | A | * | 6/1999 | Nidata et al. ............. 472/59 |
| 6,044,772 | A | * | 4/2000 | Gaudette et al. ........... 108/43 |
| 6,083,106 | A | | 7/2000 | McDowell |
| D446,263 | S | | 8/2001 | Heys |
| 6,776,104 | B2 | | 8/2004 | Herbst |
| 7,297,060 | B2 | * | 11/2007 | Brase et al. .............. 463/36 |
| 7,322,653 | B2 | | 1/2008 | Dragusin |
| 2005/0009611 | A1 | * | 1/2005 | Masaya et al. ............ 463/46 |
| 2005/0159219 | A1 | | 7/2005 | Oswald |
| 2005/0255925 | A1 | | 11/2005 | Brase et al. |
| 2005/0282632 | A1 | | 12/2005 | James-Herbert |
| 2006/0111181 | A1 | | 5/2006 | Thorsen |
| 2007/0262628 | A1 | | 11/2007 | Perigny |
| 2008/0000400 | A1 | | 1/2008 | Curry |
| 2009/0218860 | A1 | * | 9/2009 | Hernandez et al. ........ 297/217.3 |

FOREIGN PATENT DOCUMENTS

| | | |
|---|---|---|
| EP | 1923107 A1 | 5/2008 |
| GB | 2329829 A | 4/1999 |
| GB | 2469307 | 10/2010 |
| WO | WO 2008/091165 | 7/2008 |

OTHER PUBLICATIONS

Amazon.com web page titled "MotoSeat—Video Game Driving Seat" downloaded on or about Nov. 24, 2009 from www.amazon.com/gp/product/B002WVDE8A/sr=1-7/qid=1258865420/ref=olp_product_details?ie=UTF8&me=&qid=1258865420&sr=1-7&seller=.

(Continued)

Primary Examiner — David Dunn
Assistant Examiner — Philip Gabler
(74) Attorney, Agent, or Firm — Dascenzo Intellectual Property Law, P.C.

(57) ABSTRACT

Gaming chairs include a seat sized to receive a user, a frame coupled to the seat, and a tension mechanism. The frame includes at least a foot-actuated-input-device support portion configured to support a foot-actuated input device, such as associated with a video game, in a position to receive inputs from a user's foot when the user is seated on the seat. The tension mechanism is in tension when a user is seated on the seat and applies pressure with a foot against a foot-actuated input device supported by the foot-actuated-input-device support portion and applies pressure against a back portion of the seat with the user's back. In some embodiments, the tension mechanism includes one or more straps and may be described as a strap system. In some embodiments, the gaming chair includes an extended configuration and a collapsed configuration.

23 Claims, 5 Drawing Sheets

OTHER PUBLICATIONS

Crazy Creek Products web page titled "The Original Chair" downloaded on or about Oct. 29, 2009 from www.crazycreek.com/product/1/1.

Chinawholesalegift.com web page titled "China wholesale Camping Foldable Chair, promotional Camping Foldable Chair" downloaded on or about Oct. 8, 2009 from www.chinawholesalegift.com/Family-Products/Chair/Camping-Foldable-Chair.

Chinawholesalegift.com web page titled "unique corporate Camping chair with foot-rest, executive Camping chair with foot-rest, dis . . ." downloaded on or about Oct. 8, 2009 from www.chinawholesalegift.com/Family-Products/Chair/Camping-Foldable-Chair/Camping-chair-with-foot-rest-212535680.htm.

The Virtual Roadster web page titled "Virtual Roadster Racing Simulator Cockpit" downloaded on or about Nov. 11, 2009 from www.virtualroadster.com.

BigDogGamer.com web page titled "BigDog Gaming Products" downloaded on or about Nov. 11, 2009 from http://bigdoggamer.com.

Playseats web page titled "Game Racing Seat. The best place to put your Steering Wheel" downloaded on or about Nov. 11, 2009 from www.playseat.com.

Gameracerusa.com web page titled "GameRacer Elite + Logitech G27 Wheel" downloaded on or about Nov. 11, 2009 from www.gameracerusa.com/index.php.

Precise Racing Chair web page titled "Precise Racing Chair" downloaded on or about Nov. 11, 2009 from www.precisechair.com.

VisionRacer web page titled "VisionRacer" downloaded on or about Nov. 11, 2009 from www.us.visionracer.com/us/index.html.

Home Simulator Company web page titled "Racing Simulators from HSC . . . " downloaded on or about Nov. 11, 2009 from www.myhomesimulator.com.

wheelstandpro.com web page titled "wheelstand pro" downloaded on or about Nov. 11, 2009 from www.wheelstandpro.com.

Fanatec web page titled "Fanatec Advanced German Gameware" downloaded on or about Nov. 11, 2009 from www.fanatec.de/html/index.php?id=000&lang=en.

Bob Earl Racing web page titled "Virtual Racing Chassis" downloaded on or about Nov. 11, 2009 from www.bobearlracing.com.

RacingWheelStand.com web page titled "The Racing Wheel Stand is Coming Soon . . . " downloaded on or about Nov. 11, 2009 from www.racingwheelstand.com.

Xlerator Wheel Stands web page titled "Xlerator Wheel Stands" downloaded on or about Nov. 11, 2009 from www.xwstands.com.

Wheel Stand Man web page titled "XLR81up Wheel Stand" downloaded on or about Nov. 11, 2009 from http://home.joimail.com/~wheel_stand_man/index.html.

SpeedBlack USA web page titled "SpeedBlack—USA—Welcome" downloaded on or about Nov. 11, 2009 from www.speedblackusa.com/specifications.asp.

* cited by examiner

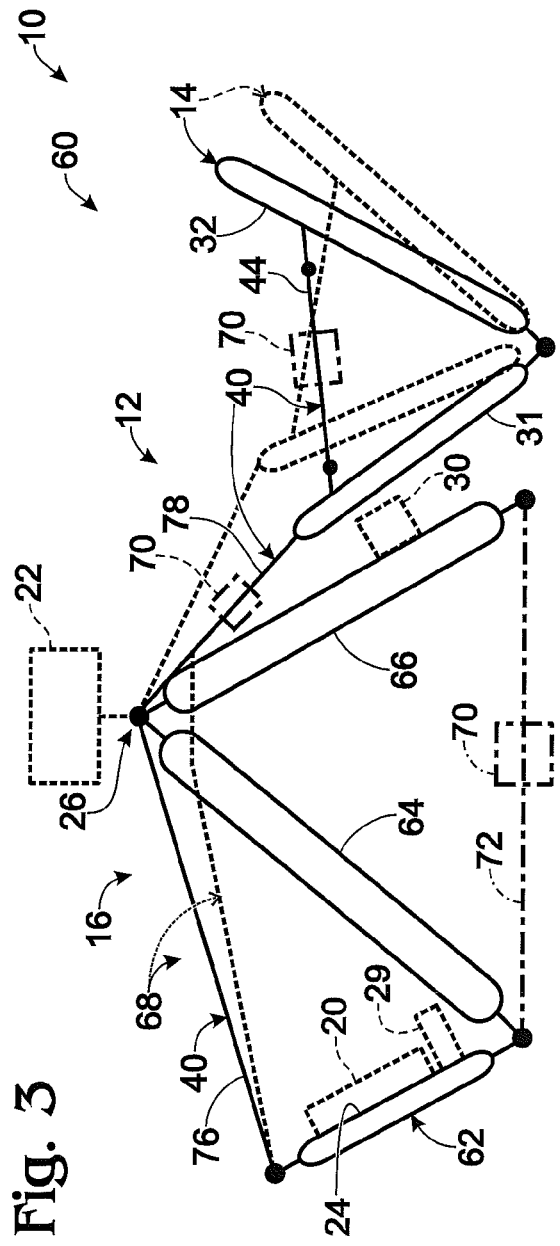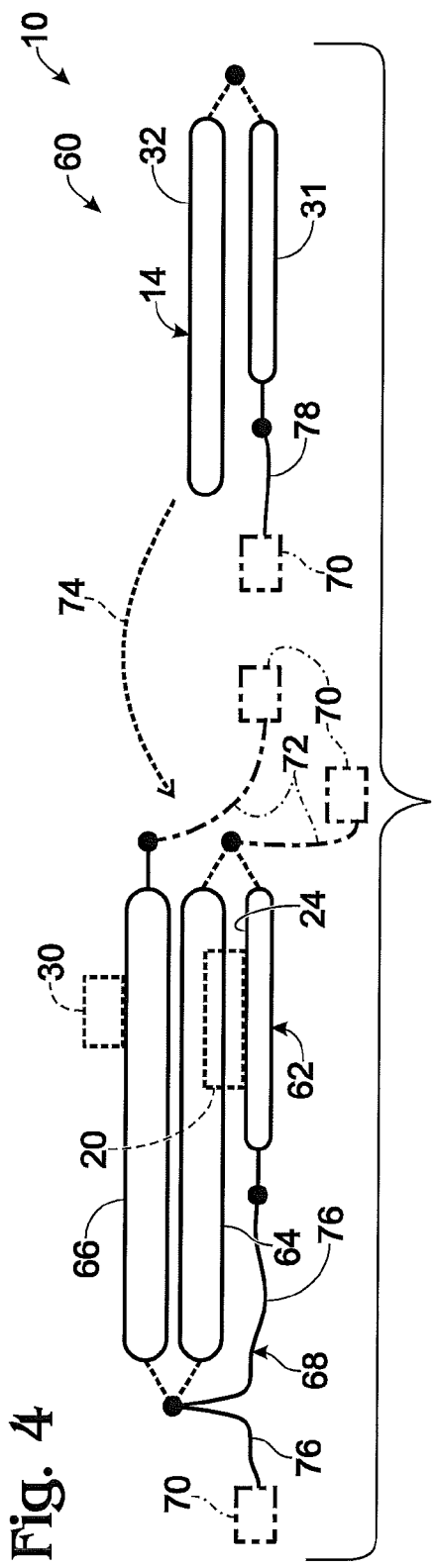

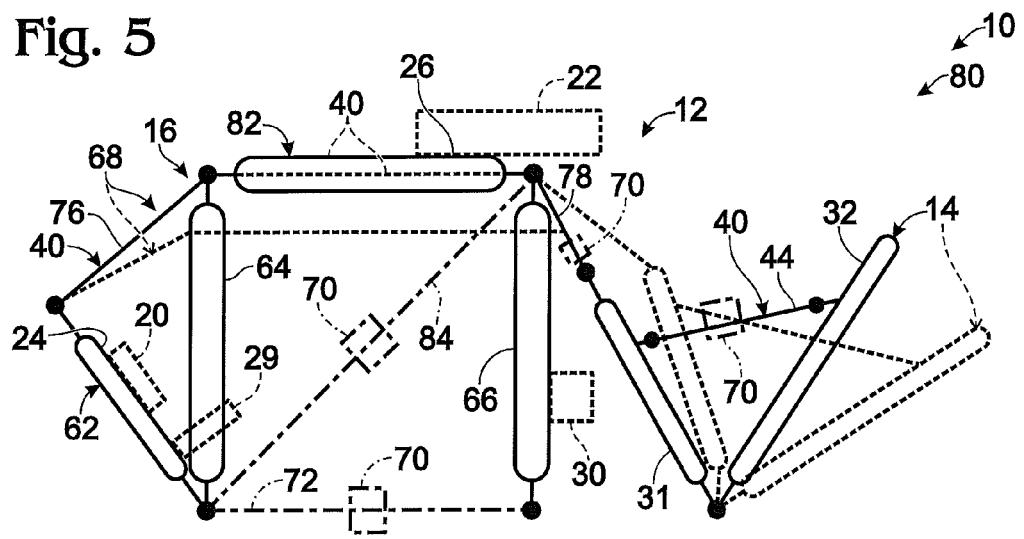
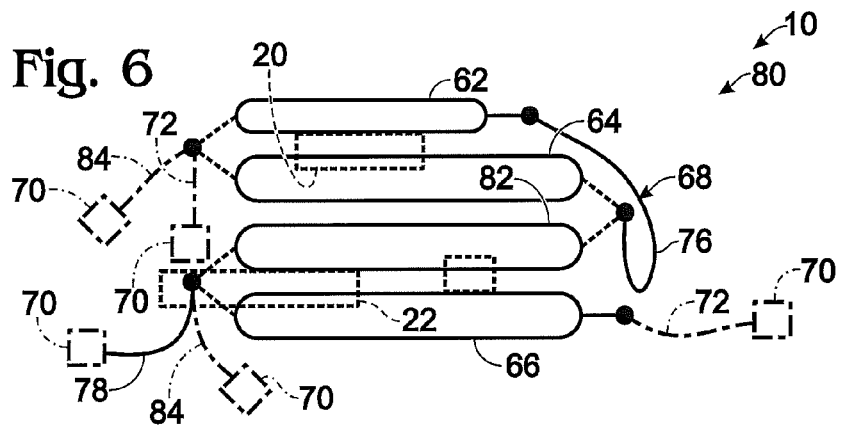
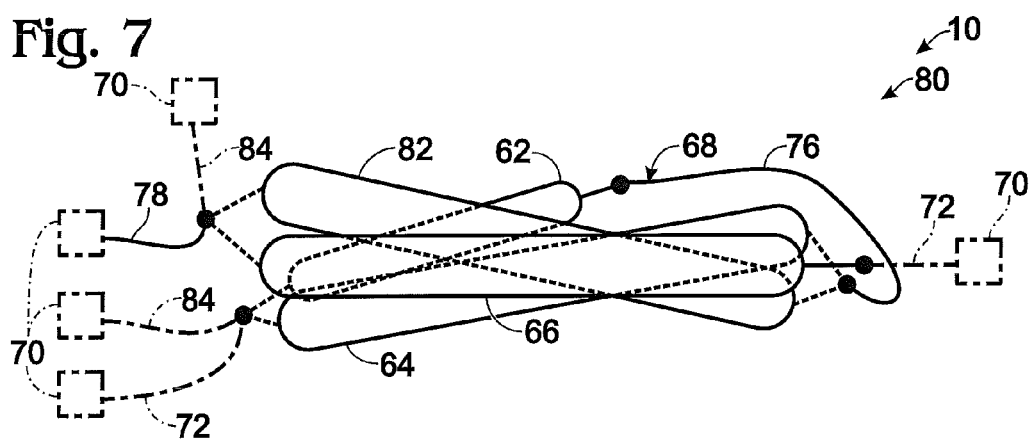

GAMING CHAIRS

FIELD OF THE DISCLOSURE

The present disclosure is directed to gaming chairs, and more particularly to gaming chairs for use with one or more user-input devices associated with a video game.

BACKGROUND OF THE DISCLOSURE

Video games are increasingly popular with both children and adults alike, both in arcade and home settings. In the home, video games are played both on personal computers and on video game consoles. A subset of video games that are particularly popular includes automotive racing games. Most players of automotive racing games, in addition to having a personal computer and/or a video game console, purchase peripheral user input devices, such as steering wheel assemblies and foot-pedal assemblies that may be used to play the games. Typically, a steering wheel assembly is configured to be secured to a table top, and a corresponding foot-pedal assembly is configured to be positioned on the floor. Accordingly, a user will typically position a chair and a table in front of his/her monitor or television, and position the steering wheel assembly and pedal assembly accordingly.

SUMMARY OF THE DISCLOSURE

Gaming chairs according to the present disclosure include at least a seat sized to receive a user, a frame coupled to the seat, and a tension mechanism. The frame includes at least a foot-actuated-input-device support portion configured to support a foot-actuated input device, such as a foot-pedal assembly associated with a video game, in a position to receive inputs from a user's foot, or feet, when the user is seated on the seat. The frame also may include a hand-actuated-input-device support portion configured to support a hand-actuated input device, such as a steering wheel assembly associated with a video game, in a position to receive inputs from a user's hand, or hands, when the user is seated on the seat. The tension mechanism is in tension when a user is seated on the seat and applies pressure with a foot against a foot-actuated input device supported by the foot-actuated-input-device support portion and applies pressure against a back portion of the seat with the user's back. In some embodiments, the tension mechanism includes one or more straps and may be described as a strap system. In such embodiments, the one or more straps are in tension when the gaming chair is in use. In some embodiments (although not required), the gaming chair includes an extended configuration for use by a user and a collapsed configuration for storage of the gaming chair.

BRIEF DESCRIPTION OF THE DRAWINGS

FIG. 3 is a schematic side elevation view schematically illustrating illustrative, non-exclusive examples of gaming chairs according to the present disclosure, the gaming chairs illustrated in a position for use by a user.

FIG. 4 is a schematic side elevation view schematically illustrating illustrative, non-exclusive examples of gaming chairs according to FIG. 3, the gaming chairs schematically illustrated in an optional collapsed configuration.

FIG. 5 is a schematic side elevation view schematically illustrating additional illustrative, non-exclusive examples of gaming chairs according to the present disclosure, the gaming chairs illustrated in a position for use by a user.

FIG. 6 is a schematic side elevation view schematically illustrating illustrative, non-exclusive examples of gaming chairs according to FIG. 5, the gaming chairs schematically illustrated in an optional collapsed configuration.

FIG. 7 is a schematic side elevation view schematically illustrating illustrative, non-exclusive examples of gaming chairs according to FIG. 5, the gaming chairs schematically illustrated in an optional collapsed configuration.

DETAILED DESCRIPTION AND BEST MODE OF THE DISCLOSURE

Figure 1:
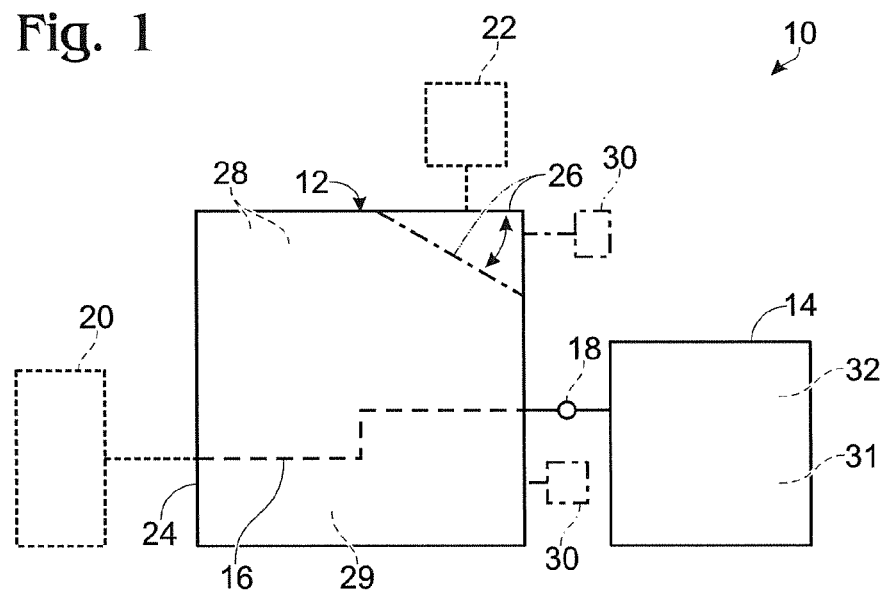
FIG. 1 is a block diagram schematically illustrating gaming chairs according to the present disclosure.

Gaming chairs according to the present disclosure are schematically illustrated in FIG. 1 and are generally indicated at 10. Gaming chairs 10 are designed to be used with one or more user-input devices associated with a video game and to support the one or more user input devices in position(s) for a user to control a video game. Illustrative, non-exclusive examples of video games with which a gaming chair 10 may be used include (but are not limited to) automotive racing games and flight simulator games, such as may be implemented on a personal computer or a video game console, such as (but not limited to) the SONY PLAYSTATION®, the MICROSOFT XBOX®, and the NINTENDO WII® video game systems. Gaming chairs 10 may be used with any other suitable types of video games and/or simulators that may or may not be considered games. Illustrative, non-exclusive examples of user input devices that may be supported by a gaming chair 10 include (but are not limited to) foot-actuated input devices such as foot-pedal assemblies, hand-actuated input devices such as steering wheel assemblies, joy sticks, track balls, mice, keyboards, etc., such as (but not limited to) user input devices sold under the LOGITECH® brand. Other types of user input devices also may be used with gaming chairs 10, and any suitable user input device is within the scope of the present disclosure.

As schematically illustrated in FIG. 1, gaming chairs 10 according to the present disclosure include at least a frame 12, a seat 14 coupled to the frame and that is sized to receive a user, and a tension mechanism 16, which, as discussed herein, operatively connects the seat to one or more portions of the frame. In some embodiments, although not required, the seat may be releasably coupled to the frame, and may therefore include a releasable fastener, or other coupler, 18, as schematically indicated at 18. That is, in some embodiments, although not required, the seat may be selectively coupled to, and selectively decoupled from, the frame.

Frame 12 is configured to support at least a foot-actuated input device 20, and in some embodiments may (but is not required to) be further configured to support a hand-actuated input device 22, as schematically illustrated in FIG. 1.

Accordingly, the frame of a gaming chair 10 may include a foot-actuated-input-device support portion 24 configured to support a foot-actuated input device in a position to receive inputs from a user's foot, or feet, when the user is seated on seat 14, and a hand-actuated-input-device support portion 26 configured to support a hand-actuated input device in a position to receive inputs from a user's hand, or hands, when the user is seated on the seat.

Frame 12 may be constructed in any suitable manner such that the frame is at least configured to support a foot-actuated input device when the gaming chair is positioned for use by a user. The frame may be unitary in construction. Additionally or alternatively, the frame may include a plurality of frame members, or components, 28 that collectively define the frame. In such embodiments, frame 12 may be described as a frame assembly 12, and a subassembly of, or a subset of, one or more frame members 28 may be described as a frame section. In some embodiments, although not required, one or more frame members, or frame sections, may be adjustable, for example, adjustable in length, such as to permit adjustment for different sizes and heights of users. In some embodiments, although not required, the frame may include a foot support member 29, configured to support a user's foot, or feet, in a position for operating a foot-actuated input device 20. Foot support member 29 may also be described as a heel support member 29 and may be described as a frame member 28 according to the present disclosure. A foot support member, when present, may take any suitable form, including (but not limited to) a strap extending between two frame members and/or a rigid frame member coupled to another frame member.

In some embodiments, although not required, the frame may be further configured to support one or more accessories 30 in a position accessible to a user's hand when the user is seated on the seat, as schematically illustrated in FIG. 1. Although two optional accessories are schematically illustrated in FIG. 1, any number of accessories, including zero, one, two, or more than two may be provided and supported by frame 12. Illustrative, non-exclusive examples of accessories that may be supported by, or otherwise coupled to, the frame include (but are not limited to) additional input devices associated with a video game, such as (but not limited to) gear shifters, monitors, speakers, microphones, cameras, etc., support members, such as for additional input devices, such as a platform for supporting a mouse, etc., and other accessories such as cup-holders, etc. Other accessories 30 are also within the scope of the present disclosure.

In some embodiments, although not required, the frame may be configured to be collapsed, disassembled, or otherwise reduced in overall size, or volume, so as to permit a user to stow, or store, the gaming chair while taking up less space than when the gaming chair is positioned for use. Accordingly, a gaming chair according to the present disclosure may be described as having an extended configuration and a collapsed configuration. In the extended configuration, and as discussed, foot-actuated-input-device support portion 24 is positioned to support a foot-actuated input device 20 in a position to receive inputs from a user's foot, or feet, when the gaming chair is positioned for use and a user is seated on seat 14. In some embodiments, when in an extended configuration, one or more of optional frame members 28 may be spaced apart from one another and in a position to support the frame in the extended configuration for use by a user. In some such embodiments, one or more of the optional frame members, or frame sections, may be angularly spaced apart from each other, in that while being coupled to one another, they are angled with respect to each other to support the frame in the extended configuration. In the optional collapsed configuration, the optional frame members may be positioned relative to each other and/or angularly positioned relative to each other so as to take up less space, or overall volume, of the gaming chair. For example, in some embodiments, two or more frame members, or frame sections, may be pivotally, or hingedly, coupled to each other, or with respect to each other, to permit folding, or collapsing, of the frame from the extended configuration to the collapsed configuration. Additionally or alternatively, two or more frame members, or frame sections, may be configured to be selectively coupled to and decoupled from each other, such that when assembled, the frame is in the extended configuration, and when disassembled, the frame is in the collapsed configuration. Other configurations of frames 12 are also within the scope of the present disclosure, and as mentioned, it is not required that a frame according to the present disclosure include a collapsed configuration.

Seat 14, as mentioned, is sized to receive a user. Accordingly, and as schematically illustrated in FIG. 1, a seat according to the present disclosure may include a base portion 31 configured to support a user's bottom (i.e., to be sat upon by a user) and a back portion 32 configured to support a user's back. Seat 14 may be constructed in any suitable manner such that the seat is at least configured to support a user in a position for use of the gaming chair and is coupled to, or, as mentioned, configured to be selectively coupled to and decoupled from, frame 12. As an illustrative, non-exclusive example, a seat 14 according to the present disclosure may be configured similar to a CRAZY CREEK™ brand collapsible chair. Other configurations, including non-collapsible configurations, are also within the scope of the present disclosure.

Figure 2:
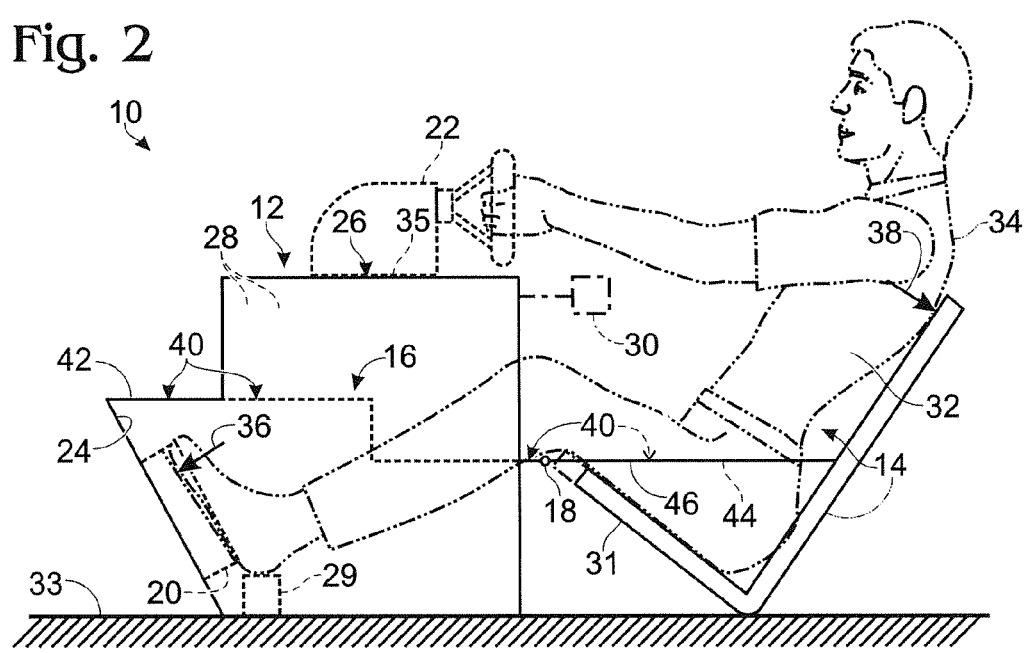
FIG. 2 is a schematic side elevation view schematically illustrating gaming chairs according to the present disclosure.

FIG. 2 schematically illustrates gaming chairs 10 according to the present disclosure positioned for use on a ground surface 33, with a user 34 seated on seat 14, with frame 12 supporting a foot-actuated input device 20 on foot-actuated-input-device support portion 24, and with frame 12 supporting a hand-actuated input device 22 on optional hand-actuated-input-device support portion 26. As discussed, and as schematically illustrated in FIG. 2, the foot-actuated input device is positioned to receive inputs from the user's feet, and the optional hand-actuated input device is positioned to receive inputs from the user's hands. In some embodiments (although not required), the angle of the foot-actuated-input-device support portion relative to the ground surface may be adjustable, for example, so that a user may position a foot-actuated input device in a suitable position for use.

Optional hand-actuated-input-device support portion 26, when present, may be configured to support any suitable hand-actuated input device in any suitable position relative to a user 34 for the user to grasp, or otherwise manipulate, with the user's hand, or hands, while sitting on seat 14. As illustrative, non-exclusive examples, some hand-actuated input devices include clamps and/or suction cups for securing the hand-actuated input device to furniture or other structure in a position for use by a user. Accordingly, frame 12, and more specifically, the hand-actuated-input-device support portion of the frame may be configured to receive clamps and/or to receive suction cups associated with a hand-actuated input device for securing the hand-actuated input device to the frame.

Although schematically illustrated as being generally parallel to ground surface 33 in FIG. 2, it is within the scope of the present disclosure that the hand-actuated-input-device support portion is configured to support a hand-actuated input device at an angle other than generally parallel to the ground surface, such as schematically and optionally illustrated in FIG. 1 with a dash-dot line. For example, as illustrative, non-exclusive examples, the hand-actuated-input-device support portion may be configured to support a hand-actuated input device at angles of about 0-90, 0-45, 0-30, 0-20, 10-40, and/or 20-40 degrees, and at angles of about 10, 20, 30, and/or 40 degrees relative to a horizontal plane that is parallel to the ground surface when the gaming chair is positioned for use by a user. Other angles and ranges of angles are also within the scope of the present disclosure, and the present disclosure is not limited to the enumerated values and ranges herein. As used herein, the angle of a hand-actuated input device may be determined by the associated mounting structure of the hand-actuated input device. For example, a LOGITECH® DRIVING FORCE™ GT gaming wheel includes a bottom flat surface configured to be supported on a table top and secured to the table top with integral clamps. In this example, the bottom flat surface of the gaming wheel—when supported by the hand-actuated-input-device support portion of the frame of a gaming chair 10 according to the present disclosure—defines the angle relative to the ground surface. Other configurations of hand-actuated input devices may also be used and may have portions or surfaces that effectively define the angle relative to a ground surface when the respective hand-actuated input device is positioned for use by a user.

In some examples of gaming chairs according to the present disclosure, hand-actuated-input-device support portion 26 may include, may be at least partially defined by, and/or may at least partially define an upper surface 35 that is configured to at least partially support a hand-actuated input device 22. In such examples, the upper surface may be at an angle of about 0-90, 0-45, 0-30, 0-20, 10-40, or 20-40 degrees, and at angles of about 10, 20, 30, or 40 degrees relative to a horizontal plane that is parallel to the ground surface when the gaming chair is positioned for use by a user. Other angles of upper surface 35 are also within the scope of the present disclosure, and the present disclosure is not limited to the enumerated values and ranges herein. When present, the upper surface may be suitable for receiving suction cups associated with a hand-actuated input device. That is, optional upper surface 35 may be smooth enough to receive suction cups and have the suction cups suitably secured thereto.

It is also within the scope of the present disclosure that the angle of hand-actuated-input-device support portion 26 and/or of optional upper surface 35 be adjustable relative to a horizontal plane that is parallel to the ground surface, with this optional adjustable configuration being schematically represented by the double-headed arrow in FIG. 1. For example, the hand-actuated-input-device portion and/or of the upper surface may be selectively adjusted by a user between angles of about 0-90, 0-45, 0-30, 0-20, 10-40, and/or 20-40 degrees relative to a horizontal plane that is parallel to the ground surface. Other adjustable ranges of angles are also within the scope of the present disclosure, and the present disclosure is not limited to the enumerated ranges herein.

As mentioned, tension mechanism 16 of a gaming chair according to the present disclosure operatively connects seat 14 to one or more portions of frame 12. More specifically, and as schematically illustrated in FIG. 2, tension mechanism 16 operatively connects, or links, foot-actuated-input-device support portion 24 of the frame to the seat, so that the tension mechanism is in tension between the foot-actuated-input-device support portion and the seat when a user 34 is seated on the seat and applies pressure with a foot against a foot-actuated input device 20, as indicated by the arrow at 36, and/or when a user applies pressure against back portion 32 of the seat with the user's back, as indicated by the arrow at 38.

Tension mechanism 16 may take any suitable form and be constructed of any suitable number of components such that the foot-actuated-input-device support portion of the frame is operatively connected, or linked, to the seat, as discussed herein. For example, and as schematically indicated in FIG. 2, the tension mechanism may include a plurality of tension members 40 operatively connecting the foot-actuated-input-device support portion to the seat. For example, the tension mechanism may (but is not required to) include at least a portion of frame 12, such as at least a portion of one or more of optional frame members 28. Additionally or alternatively, the frame may be described as including at least a portion of the tension mechanism. This is schematically illustrated in FIG. 2, in which a frame member 42 includes a portion of the tension mechanism and is indicated as a tension member 40. Tension members 40 according to the present disclosure additionally may be (although are not required to be) adjustable in length.

In FIG. 2, seat 14 is schematically illustrated in dash-dot lines in an overlapping arrangement with tension mechanism 16 and tension member(s) 40 thereof, schematically illustrating that tension mechanism 16 may extend through and/or may include at least a portion of the seat, such as at least a portion of base portion 31 of the seat. Additionally or alternatively, the seat may be described as including at least a portion of the tension mechanism. In some embodiments in which the tension mechanism includes at least a portion of the seat, a tension member 44 may operatively connect the base portion of the seat to back portion 32 of the seat. In such embodiments, a separate tension member 46 may operatively connect the frame to the base portion of the seat. In such embodiments, the seat may be described as including tension member 44, and the tension mechanism may be described as including at least a portion of the base portion of the seat. Additionally or alternatively, a single tension member 40 may operatively connect the frame to the back portion of the seat with or without the tension member extending through, or including at least a portion of, the base portion of the seat. Other configurations are also within the scope of the present disclosure.

In some examples of gaming chairs 10 according to the present disclosure, the tension mechanism may include one or more straps. Additionally or alternatively, one or more of tension members 40 may include a strap, or be described as a strap. Tension mechanisms 16 according to the present disclosure that include one or more straps may be described as strap systems. As used herein, a strap is a member that is configured to be put in tension, but that is not configured to be put in compression. Illustrative, non-exclusive examples of suitable straps, as used herein, include (but are not limited to) webbing, rope, string, chain, cord, cable, etc., with such straps being constructed of any suitable material. For example, an illustrative, non-exclusive example of a suitable strap includes nylon webbing, but other configurations of straps are also within the scope of the present disclosure.

In examples of tension mechanisms that include at least one strap, at least one strap may extend between the foot-actuated-input-device support portion and another portion of the frame. Additionally or alternatively, at least one strap may extend between the seat and the frame. Additionally or alternatively, at least one strap may extend between the foot-actuated-input-device support portion and the seat. Other straps and configurations thereof also may be used. When used, straps may be attached to the frame, a frame member thereof, the seat, and/or a portion thereof by any suitable mechanism. For example, as illustrative, non-exclusive examples, a strap may be wrapped around a frame member and secured to itself with stitching, snaps, hook and loop fasteners, or another suitable permanent or releasable fastening mechanism. Additionally or alternatively, a strap may include hook and loop fasteners, such that the strap may be wrapped around a frame member and secured to itself with complimentary portions of hook and loop fasteners. Additionally or alternatively, a strap may be directly stitched, or otherwise permanently or releasably secured, to a portion of the seat or other portion of the gaming chair. Other configurations are also within the scope of the present disclosure.

FIG. 2 also schematically illustrates optional foot support member 29 of frame 12. As schematically illustrated, the optional foot support member may be configured to support a user's foot, or feet, in a position above ground surface 33 when the gaming chair is positioned for use. Such a configuration may be suitable depending on a particular configuration of foot-actuated input device 20 being used with gaming chair 10.

Illustrative, non-exclusive examples of gaming chairs 10 according to the present disclosure are schematically illustrated in FIG. 3 and are generally indicated at 60. Gaming chairs 60 are schematically illustrated as having an optional foot support member 29, and are further illustrated together with a foot-actuated input device 20 and a hand-actuated input device 22.

Gaming chairs 60 according to the present disclosure include a foot-actuated-input-device support section 62 that defines foot-actuated-input-device support portion 24, a forward frame section 64 operatively coupled to the foot-actuated-input-device support section, and a rear frame section 66 operatively coupled to the forward frame section. The forward frame section and the rear frame section are configured so that hand-actuated-input-device support portion 26, when present, is positioned to support a hand-actuated input device 22 in a position to receive inputs from a user's hand when the user is seated on seat 14. The schematic illustration of the hand-actuated-input-device support portion in FIG. 3 schematically represents that one or more of the forward frame section, the rear frame section, and/or an additional frame section (as discussed herein) may define the hand-actuated-input-device support portion, when present.

In some embodiments, although not required, one or both of the forward frame section and/or the rear frame section may be adjustable in height, or length, such that one or both of the forward frame section and the rear frame section may be lengthened for use by a larger or taller user and may be shortened for use by a smaller or shorter user.

The representation in FIG. 3 of the operative couplings, or connections, between foot-actuated-input-device support section 62 and forward frame section 64, between the forward frame section and rear frame section 66, and between base portion 31 and back portion 32 of seat 14, schematically represents that the frame sections and the seat portions may (but are not required to) be one or both of operatively hinged, and/or pivotally coupled, with respect to each other, and/or configured to be selectively decoupled from each other to define both an extended configuration, as schematically illustrated in FIG. 3, and an optional collapsed configuration, as schematically illustrated in FIG. 4. Stated differently, in some embodiments the foot-actuated-input-device support section may be pivotally coupled to, and/or configured to be decoupled from, the forward frame section. Additionally or alternatively, the forward frame section may be pivotally coupled to, and/or configured to be decoupled from, the rear frame section. Additionally or alternatively, the base portion of the seat may be pivotally coupled to, and/or configured to be decoupled from, the back portion of the seat. In FIG. 4, the schematic representation of the couplings, or connections, between the respective frame sections and seat portions are illustrated in dashed lines, schematically representing an optional decoupled condition between respective frame sections and seat portions.

Additionally or alternatively, it is within the scope of the present disclosure that respective frame sections and respective seat portions are fixed relative to each other such that a gaming chair 60 according to the present disclosure does not have a collapsed configuration. It is not required that all operative couplings, or connections, be one of hinged, fixed, and/or configured to be decoupled, and any combination may be used with respect to gaming chairs 10, including gaming chairs 60, according to the present disclosure.

As schematically illustrated in FIG. 3, gaming chairs 60 according to the present disclosure may include a tension mechanism 16 in the form of a strap system 68 that operatively connects, or links, foot-actuated-input-device support section 62 to seat 14. More specifically, strap system 68 may include one or more tension members 40 in the form of one or more straps that operatively connect, or link, the foot-actuated-input-device support section to base portion 31 of the seat, and a tension member 44 in the form of one or more straps that operatively connect the base portion of the seat to back portion 32 of the seat. The tension member(s) extending between the foot-actuated-input-device support section and the base portion of the seat is/are schematically illustrated as extending through the coupling, or connection, between the forward frame section and the rear frame section, schematically indicating that the strap(s) of the strap system may be coupled to one or both of the forward frame section and the rear frame section. Additionally or alternatively, strap system 68 may be described as including at least one forward tension strap 76 that extends between the foot-actuated-input-device support section and at least one of the forward frame section and the rear frame section, and at least one rear tension strap 78 that extends between the seat and at least one of the forward frame section and the rear frame section. In some embodiments (although not required), the forward tension strap(s) and/or the rear tension strap(s) may be adjustable in length, for example, to permit selective adjustment of gaming chairs according to the present disclosure. For example, a user may selectively lengthen and/or shorten tension strap(s) 76 and thereby selectively adjust the angle of foot-actuated-input-device support section 62 relative to ground surface 33 in embodiments in which the foot-actuated-input-device support section is pivotally, or hingedly, coupled to forward frame section 64.

Additionally or alternatively, as schematically illustrated in dashed lines in FIG. 3, the strap system may include one or more straps that extend through, or are otherwise coupled, or connected, to the forward frame section and/or the rear frame section. Other configurations of tension mechanisms and straps systems are also within the scope of the present disclosure.

In some embodiments, although not required, one or more of the straps that define strap system 68 may include a coupler 70 that permits selective decoupling and coupling of straps with respect to each other and/or with respect to a frame section and/or with respect to themselves. For example, in FIG. 3, rear tension strap 78 is schematically illustrated as having an optional coupler 70. An illustrative, non-exclusive example of a coupler may be in the form of a side-release buckle. Other configurations of optional couplers 70 are also within the scope of the present disclosure.

FIG. 3 also schematically illustrates an optional frame member, or section, 72, which may, when present, be in the form of, or include, one or more straps, and which may, when present, include a coupler 70. Additionally or alternatively, an optional frame member 72 may be rigid and/or include one or more rigid members. When present, optional frame member 72 may provide additional support to frame 12 when in an extended configuration or otherwise in a position for use by a user.

As mentioned, an optional foot support member 29 is schematically illustrated in FIG. 3. Although schematically illustrated as being attached to foot-actuated-input-device support section 62, a foot support member, when present, may be attached to, or be integral to, any suitable frame component, including the foot-actuated-input-device support section and/or forward frame section 64. Additionally or alternatively, a foot support member, when present, may be adjustable in size, height, position, etc., such that a user may adjust the foot support member to suitably position it relative to a foot-actuated input device 20.

FIG. 3 schematically illustrates, in dashed lines, seat 14 in an in-use position. When a user leans back in seat 14, the user effectively applies pressure against the back portion of the seat, and when the user further applies pressure against a foot-actuated input device 20, strap system 68 is in tension between the seat and foot-actuated-input-device support section 62.

Referring again to FIG. 4, optional collapsed configures of gaming chairs 60 are schematically illustrated. As illustrated, the frame sections of gaming chairs 60, when in a collapsed configuration, may be positioned generally adjacent to each other. In some collapsed configurations, the frame sections may be described as being generally parallel to each other. As schematically illustrated at 74, it is within the scope of the present disclosure that seat 14 of a gaming chair 60 may additionally or alternatively be positioned together with the frame sections of the frame of the gaming chair. For example, for suitable storage, the seat may be stacked with the frame sections, may be positioned between respective frame sections, and/or may remain coupled to the frame.

In FIG. 4, the associated hand-actuated input device is not illustrated. It is within the scope of the present disclosure, however, that a hand-actuated input device may remain coupled to, or may be decoupled from, the frame, when a gaming chair 10 according to the present disclosure, including a gaming chair 60, is configured to an optional collapsed configuration.

Additional illustrative, non-exclusive examples of gaming chairs 10 according to the present disclosure are schematically illustrated in FIG. 5 and are generally indicated at 80. Where appropriate, the reference numerals from the illustrative, non-exclusive examples of gaming chairs 60 of FIG. 3 are used to designate corresponding parts of gaming chairs 80. For example, gaming chairs 80, like gaming chairs 60 of FIG. 3, include a frame 12 with a foot-actuated-input-device support section 62, a forward frame section 64, a rear frame section 66, and a seat 14 with a base portion 31 and a back portion 32. However, gaming chairs 80 according to the present disclosure have a frame that further includes an upper frame section 82 operatively coupled to the forward frame section and the rear frame section, and defining hand-actuated-input-device support portion 26 so that a hand-actuated input device may be positioned to receive inputs from a user's hand when the user is seated on the seat, such as schematically illustrated in FIG. 5.

Like the schematic illustration of gaming chairs 60 discussed above, the representation in FIG. 5 of the operative couplings, or connections, between the respective frame sections and the seat portions of gaming chairs 80, schematically represents that the frame sections and the seat portions may (but are not required to) be one or both of operatively hinged, and/or pivotally coupled, with respect to each other and/or configured to be selectively decoupled from each other to define both an extended configuration, as schematically illustrated in FIG. 5, and optional collapsed configurations, as schematically illustrated in FIGS. 6-7. Stated differently, in some embodiments, the foot-actuated-input-device support section may be pivotally coupled to, and/or be configured to be decoupled from, the forward frame section. Additionally or alternatively, the forward frame section may be pivotally coupled to, and/or configured to be decoupled from, the upper frame section. Additionally or alternatively, the upper frame section may be pivotally coupled to, and/or configured to be decoupled from, the rear frame section. Additionally or alternatively, the base portion of the seat may be pivotally coupled to, and/or configured to be decoupled from, the back portion of the seat. In FIGS. 6-7, the schematic representation of the couplings, or connections, between the respective frame section and the seat portions are illustrated in dashed lines, schematically representing an optional decoupled condition between respective frame sections and seat portions.

Additionally or alternatively, it is within the scope of the present disclosure that respective frame sections and respective seat portions are fixed relative to each other such that a gaming chair 80 according to the present disclosure does not have a collapsed configuration. It is not required that all operative couplings, or connections, be one of hinged, fixed, and/or configured to be decoupled, and any combination may be used with respect to gaming chairs 10, including gaming chairs 80, according to the present disclosure.

As schematically illustrated in FIG. 5, gaming chairs 80 according to the present disclosure may include a tension mechanism 16 in the form of a strap system 68 that operatively connects, or links, foot-actuated-input-device support section 62 to seat 14 via one or more tension members 40 in the form of one or more straps. Strap system 68 is schematically illustrated as extending through upper frame section 82, schematically indicating that the tension mechanism may include at least a portion of the upper frame section. Additionally or alternatively, the upper frame section may define at least a portion of the tension mechanism. For example, a first tension member 40, in the form of one or more straps, may extend between the foot-actuated-input-device support section and one of the forward frame section and the upper frame section, and a second tension member 40, in the form of one or more straps, may extend between the seat and one of the rear frame section and the upper frame section. In some such examples, the upper frame section itself defines a tension member 40 to operatively connect one or more straps of the strap system. Additionally or alternatively, a tension member in the form of a strap may extend through the upper frame section and directly connect the foot-actuated-input-device support section and the seat. Additionally or alternatively, strap system 68 may be described as including at least one forward tension strap 76 that extends between the foot-actuated-input-device support section and at least one of the forward frame section, the upper frame section, and the rear frame section, and at least one rear tension strap 78 that extends between the seat and at least one of the rear frame section, the upper frame section, and the forward frame section. Additionally or alternatively, as schematically illustrated in dashed lines in FIG. 5, the strap system may include one or more straps that extend through, or are otherwise coupled, or connected, to the forward frame section and/or the rear frame section. Other configurations of tension mechanisms and strap systems are also within the scope of the present disclosure.

FIG. 5 also schematically illustrates an optional frame member, or section, 84, which may, when present, be in the form of, or include, one or more straps, and which when present, may include a coupler 70. Additionally or alternatively, an optional frame member 84 may be rigid and/or include one or more rigid members. When present, optional frame member 84 may provide additional support to frame 12 when in an extended configuration or otherwise in a position for use by a user.

Referring to FIGS. 6-7, gaming chairs 80 are schematically illustrated in optional collapsed configurations. As illustrated, the frame sections of gaming chairs 80, when in a collapsed configuration, may be positioned generally adjacent to each other. In some collapsed configurations, the frame sections may be described as being generally parallel to each other. FIG. 6 schematically illustrates a collapsed configuration in which the frame sections are generally stacked relative to each other and in a generally parallel configuration with respect to each other. FIG. 7 schematically illustrates that, when in a collapsed configuration, the frame sections may additionally or alternatively be nested relative to each other, such that an overall volume of space of the gaming chair in a collapsed configuration is less than such a collapsed configuration as schematically illustrated in FIG. 6. Stated differently, the frame sections may be configured (e.g., sized, shaped, etc.) such that a portion of one frame section may be positioned within a portion of another frame section. In the illustrative, non-exclusive example of a collapsed configuration schematically illustrated in FIG. 7, foot-actuated-input-device support section 62, forward frame section 64, and upper frame section 82 are partially nested within rear frame section 66. Other configurations are also within the scope of the present disclosure, and it is also within the scope of the present disclosure that a gaming chair 60, such as illustrated in FIG. 3 and discussed herein, has a collapsed configuration with one or more frame sections nested, or otherwise positioned within, another frame section. Although not illustrated in FIGS. 6-7, it is within the scope of the present disclosure that seat 14 of a gaming chair 80 may additionally or alternatively be positioned together with the frame sections of the frame of the gaming chair. That is, the seat may remain coupled to the frame or the seat may be decoupled from the frame and may, for example, be stacked with the frame sections, may be positioned between respective frame sections, etc.

Turning now to FIGS. 8-11, illustrative, non-exclusive examples of gaming chairs 10 according to the present disclosure are illustrated. Where appropriate, the reference numerals from the schematic illustrations of FIGS. 1-7 are used to designate corresponding parts of gaming chairs 10 according to the present disclosure; however, the examples of FIGS. 8-11 are non-exclusive and do not limit the present disclosure to the illustrated embodiments. That is, neither gaming chairs nor various portions thereof are limited to the specific embodiments disclosed and illustrated in FIGS. 8-11, and gaming chairs according to the present disclosure may incorporate any number of the various aspects, configurations, characteristics, properties, etc. illustrated in the embodiments of FIGS. 8-11, in the schematic representations of FIGS. 1-7, as well as variations thereof, without requiring the inclusion of all such aspects, configurations, characteristics, properties, etc. For the purpose of brevity, each previously discussed component, part, portion, aspect, region, etc. or variants thereof, may not be discussed again with respect to FIGS. 8-11; however, it is within the scope of the present disclosure that the previously discussed features, materials, variants, etc. may be utilized with the illustrated embodiments of FIGS. 8-11.

Figure 8:
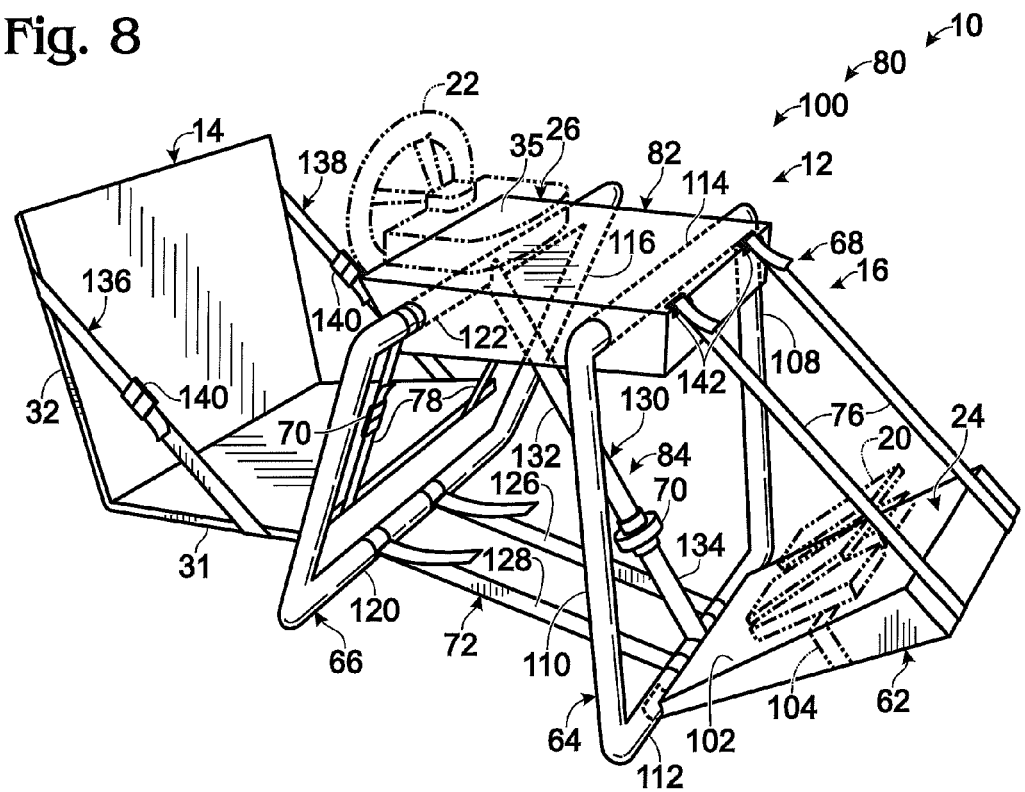
FIG. 8 is an isometric view of an illustrative, non-exclusive example of a gaming chair according to the present disclosure, with the gaming chair illustrated in a position for use for a user.
Figure 9:
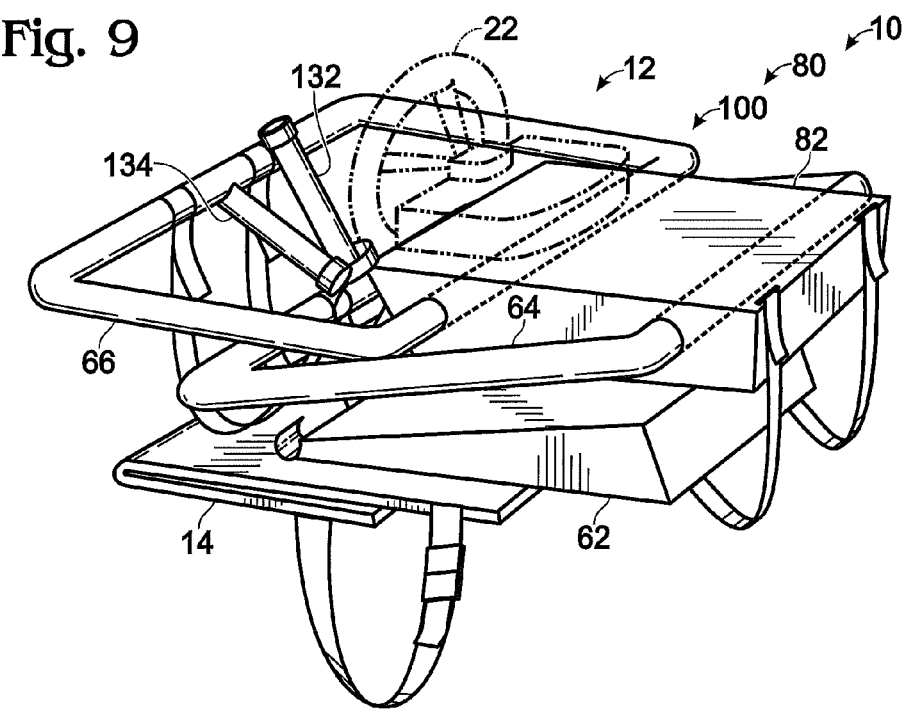
FIG. 9 is an isometric view of the gaming chair of FIG. 8, with the gaming chair illustrated in a collapsed configuration.

An illustrative, non-exclusive example of a gaming chair 10 according to the present disclosure is illustrated in FIGS. 8-9 and is generally indicated at 100. Gaming chair 100 is an example of a gaming chair 80 according to the present disclosure, such as schematically illustrated in FIG. 5 and discussed herein. Gaming chair 100 is illustrated in an extended configuration for use by a user in FIG. 8 and in a collapsed configuration in FIG. 9.

Gaming chair 100 includes a frame 12 that includes a foot-actuated-input-device support section 62, a forward frame section 64, a rear frame section 66, an upper frame section 82, an optional frame section 72, and an optional frame section 84. Gaming chair 100 further includes a seat 14 and a tension mechanism 16 that operatively connects, or links, the foot-actuated-input-device support section to the seat via the frame. In FIGS. 8-9, the upper frame section is illustrated as partially transparent to reveal hidden structure that otherwise would not be clear in the Figures, and, while within the scope of the present disclosure, it is not a requirement that the upper frame section be constructed of a transparent material.

The foot-actuated-input-device support section 62 of gaming chair 100 is hingedly coupled to the forward frame section and includes a platform 102 that defines a foot-actuated-input-device support portion 24 for supporting a foot-actuated input device 20. A strap 104 is provided to secure a foot-actuated input device to the platform.

The forward frame section 64 of gaming chair 100 includes a left-forward frame member 108, a right-forward frame member 110, a base-forward frame member 112 disposed between the left-forward frame member and the right-forward frame member, and an upper-forward frame member 114 disposed between the left-forward frame member and the right-forward frame member. The upper-forward frame member extends through the upper frame section, such that the forward frame section is hingedly coupled to the upper frame section.

The rear frame section 66 of gaming chair 100 includes a left-rear frame member 116, a right-rear frame member 118, a base-rear frame member 120 disposed between the left-rear frame member and the right-rear frame member, and an upper-rear frame member 122 disposed between the left-rear frame member and the right-rear frame member. The upper-rear frame member extends through the upper frame section, such that the rear frame section is hingedly coupled to the upper frame section.

The upper frame section 82 of gaming chair 100 includes an upper surface 35 that defines a hand-actuated-input-device support portion 26 for supporting a hand-actuated input device 22. Surface 35 is configured to receive suction cups associated with a suitable hand-actuated input device, and the upper frame section is configured to receive clamps associated with a suitable hand-actuated input device.

The optional frame section 72 of gaming chair 100 includes a pair of straps 126, 128 that extends between, and couples, base-forward frame member 112 and base-rear frame member 120. When gaming chair 100 is in the extended configuration, as illustrated in FIG. 8, straps 126, 128 are in tension between the forward frame section and the rear frame section.

The optional frame section 84 of gaming chair 100 includes a rigid frame member 130 that extends between, and selectively couples, base-forward frame member 112 and upper-rear frame member 122. Rigid frame member 130 also includes a coupler 70, which permits for selective coupling and decoupling of an upper portion 132 and a lower portion 134 of the rigid frame member.

The seat 14 of gaming chair 100 includes a base portion 31 hingedly connected to a back portion 32, and further includes a pair of straps 136, 138 that adjustably connect the base portion to the back portion, and which may be described as components of the tension mechanism 16 of gaming chair 100. Specifically, a ladder lock 140 is provided for each of straps 136 and 138 to permit a user to adjust the angular relation between the base portion and the back portion of the seat.

The tension mechanism 16 of gaming chair 100 may be described as a strap system 68 according to the present disclosure. The strap system of gaming chair 100 includes a pair of forward tension straps 76 extending between the foot-actuated-input-device support section and the upper frame section of the frame, and a pair of rear tension straps 78 extending between the seat and the rear frame section of the frame. The forward tension straps include integral hook and loop fasteners to permit the selective sizing of the length of the forward tension straps, and thus the angle of the foot-actuated-input-device support section relative to the forward frame section. Specifically, the upper ends of the forward tension straps extend through passages 142 of the upper frame section and loop back and are secured to themselves with the integral hook and loop fasteners.

The rear tension straps of gaming chair 100 each include an optional coupler 70 in the form of a side-release buckle with integral ladder lock. Accordingly, a user of a gaming chair 100 may selectively couple the seat to, and decouple the seat from, the frame of the gaming chair, and may further selectively adjust the length of the rear tension straps.

To reconfigure gaming chair 100 from the extended configuration, illustrated in FIG. 8, to the collapsed configuration, illustrated in FIG. 9, a user decouples upper portion 132 and lower portion 134 of rigid frame member 130 from each other, and pivots the frame sections relative to each other so that they are somewhat parallel and generally adjacent to each other for ease of storage, as illustrated in FIG. 9. In the illustrated embodiment of gaming chair 100, foot-actuated-input-device support section 62 disconnects from base-forward frame member 112, as illustrated in FIG. 9.

Figure 10:
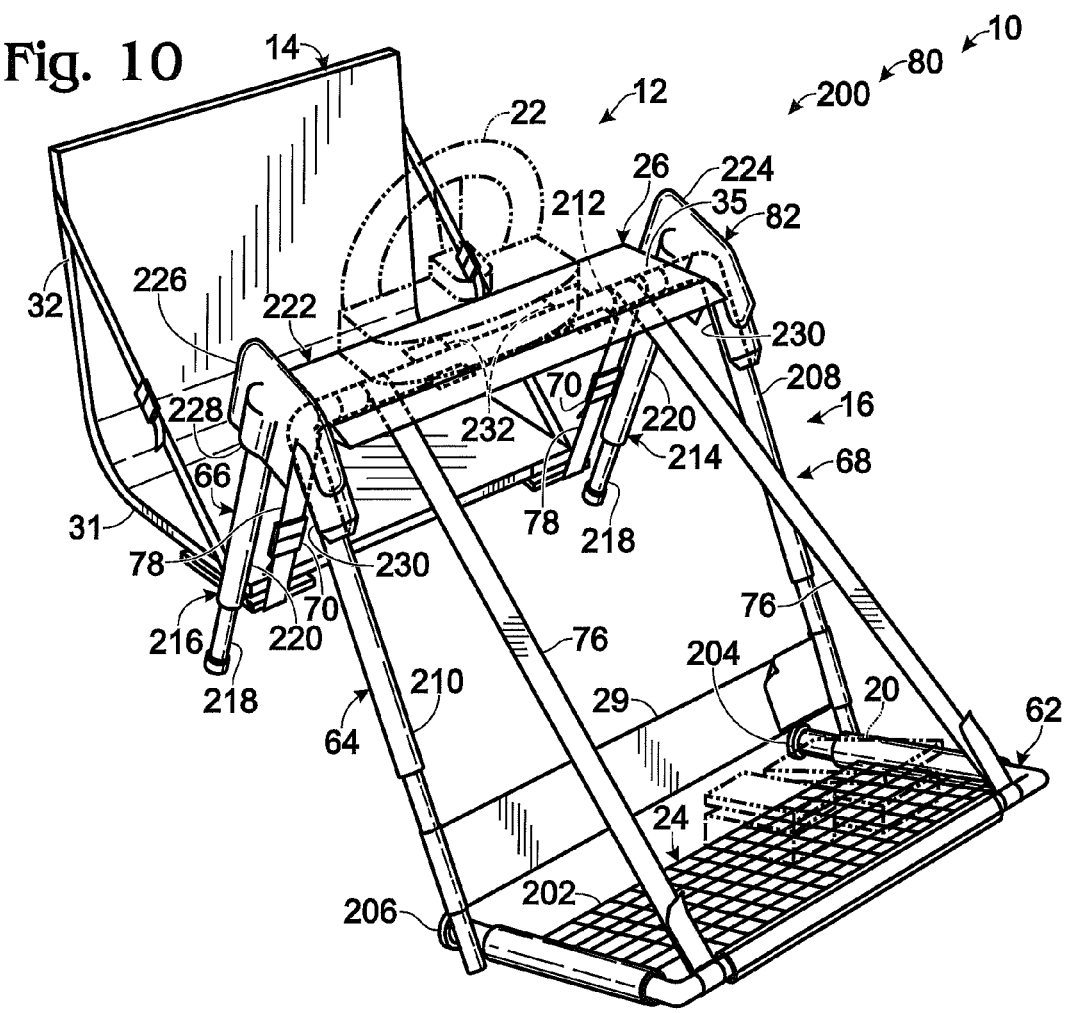
FIG. 10 is an isometric view of another illustrative, non-exclusive example of a gaming chair according to the present disclosure, with the gaming chair illustrated in a position for use by a user.
Figure 11:
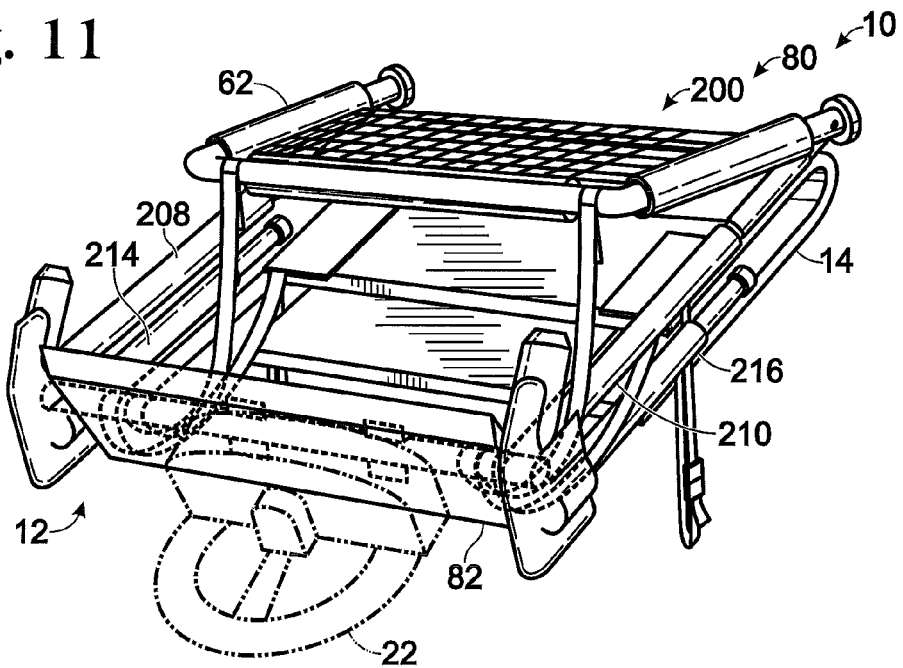
FIG. 11 is an isometric view of the gaming chair of FIG. 10, with the gaming chair illustrated in a collapsed configuration.

Another illustrative, non-exclusive example of a gaming chair 10 according to the present disclosure is illustrated in FIGS. 10-11 and is generally indicated at 200. Gaming is chair 200 is another example of a gaming chair 80 according to the present disclosure, such as schematically illustrated in FIG. 5 and discussed herein. Gaming chair 200 is illustrated in an extended configuration for use by a user in FIG. 10 and in a collapsed configuration in FIG. 11.

Gaming chair 200 includes a frame 12 that includes a foot-actuated-input-device support section 62, a forward frame section 64, a rear frame section 66, and an upper frame section 82. Gaming chair 200 further includes a seat 14 and a tension mechanism 16 that operatively connects, or links, the foot-actuated-input-device support section to the seat via the frame. In FIGS. 10-11, the upper frame section is illustrated as partially transparent to reveal hidden structure that otherwise would not be clear in the Figures, and, while within the scope of the present disclosure, it is not a requirement that the upper frame section be constructed of a transparent material.

The foot-actuated-input-device support section 62 of gaming chair 200 is hingedly coupled to the forward frame section and includes a platform 202 that defines a foot-actuated-input device portion 24 for supporting a foot-actuated input device 20. Platform 202 may be constructed of any suitable material and in any suitable manner. The foot-actuated-input-device support section of gaming chair 200 further includes a left foot 204 and a right foot 206, both positioned to engage a ground surface when the gaming chair is positioned for use by a user. As illustrated, although not required, the forward frame section of gaming chair 200 is hingedly coupled to the foot-actuated-input-device support section at a position above the left foot and the right foot of the foot-actuated-input-device support section, such that the foot-actuated-input-device support section engages the ground surface, and such that the forward frame section does not engage the ground surface, when the gaming chair is positioned for use by a user, as illustrated in FIG. 10.

The forward frame section 64 of gaming chair 100 includes a left-forward frame member 208, a right-forward frame member 210, and an upper-forward frame member 212 disposed between the left-forward frame member and the right-forward frame member. The upper-forward frame member is hingedly mounted to the upper frame section, such that the forward frame section is hingedly coupled to the upper frame section. The forward frame section of gaming chair 200 also includes a foot support member 29 in the form of a strap that extends between the left-forward frame member and the right-forward frame member. The strap includes integral hook and loop fasteners to permit a user to selectively adjust the length of the strap between the left-forward frame member and the right-forward frame member. Accordingly, the slackness in the strap may be adjusted to permit a user to adjust his/her foot or feet position relative to a foot-actuated input device.

The rear frame section 66 of gaming chair 200 includes a left leg 214 extending from an underside of the upper frame section and a right leg 216 extending from the underside of the upper frame section. The left and right legs, although not required, are adjustable in height, and each includes a lower leg portion 218 in telescopic relation to an upper leg portion 220. Any suitable mechanism may be used to permit selective adjustment of the lower leg portions relative to the upper leg portions.

The upper frame section 82 of gaming chair 200 includes a middle section 222 disposed between a left leg-support member 224 and a right leg-support member 226. The middle section defines hand-actuated-input-device portion 26 and optional upper surface 35, which, as illustrated, are configured to support a hand-actuated input device 22 in a position for a user to engage with his/her hands when seated in the seat. The left-leg support member and the right-leg support member each include a rear socket 228 for receiving left leg 214 and right leg 216, respectively, of the rear frame section. The left-leg support member and the right-leg support member each further include a forward socket 230 for receiving left-forward frame member 208 and right-forward frame member 210, respectively, of the forward frame section. Forward sockets 230 further define the extent of pivotal rotation of the front frame section relative to the upper frame section.

As illustrated in hidden lines FIG. 10, the upper frame section also includes a pair of brackets 232 that secure the front frame section to the underside of the upper frame section and that permit the hinged relationship between the two.

The tension mechanism 16 of gaming chair 200 may be described as a strap system 68 according to the present disclosure. The strap system of gaming chair 200 includes a pair of forward tension straps 76 extending between the foot-actuated-input-device support section and upper-forward frame member 212 of the forward frame section, and a pair of rear tension straps 78 extending between the seat and upper-forward frame member 212 of the forward frame section.

To reconfigure gaming chair 200 from the extended configuration, illustrated in FIG. 10, to the collapsed configuration, illustrated in FIG. 11, a user pivots the foot-actuated-input-device support section relative to the forward frame section and the forward frame section relative to the upper frame section, so that the frame sections are somewhat parallel and generally adjacent to each other for ease of storage, as illustrated in FIG. 11.

The following enumerated paragraphs represent illustrative, non-exclusive ways of describing inventions according to the present disclosure.

A A gaming chair, comprising:
 a seat sized to receive a user and including a base portion and a back portion;
 a frame coupled to the seat and including:
  a hand-actuated-input-device support portion configured to support a hand-actuated input device in a position to receive inputs from a user's hand when the user is seated on the seat; and
  a foot-actuated-input-device support portion configured to support a foot-actuated input device in a position to receive inputs from a user's foot when the user is seated on the seat; and
 a tension mechanism, wherein the tension mechanism is in tension when a user is seated on the seat and applies pressure with a foot against a foot-actuated input device supported by the foot-actuated-input-device support portion and applies pressure against the back portion of the seat with the user's back.

A1 The gaming chair of paragraph A, wherein the tension mechanism operatively connects the foot-actuated-input-device support portion to the seat so that the tension mechanism is in tension between the foot-actuated-input-device support portion and the seat when a user is seated on the seat and applies pressure with a foot against a foot-actuated input device supported by the foot-actuated-input-device support portion and applies pressure against the back portion of the seat with the user's back.

A2 The gaming chair of any of paragraphs A-A1, wherein the tension mechanism operatively connects the foot-actuated-input-device support portion to another portion of the frame and the seat to the frame.

A3 The gaming chair of any of paragraphs A-A2, wherein the frame includes at least a portion of the tension mechanism.

A4 The gaming chair of any of paragraphs A-A3, wherein the tension mechanism includes at least a portion of the frame.

A5 The gaming chair of any of paragraphs A-A4, wherein the seat includes at least a portion of the tension mechanism.

A6 The gaming chair of any of paragraphs A-A5, wherein the tension mechanism includes at least a portion of the seat.

A7 The gaming chair of any of paragraphs A-A6, wherein the tension mechanism includes at least one strap.

A7.1 The gaming chair of paragraph A7, wherein the tension mechanism includes a plurality of straps.

A8 The gaming chair of any of paragraphs A-A7.1, wherein the tension mechanism includes at least one strap extending between the seat and the frame.

A9 The gaming chair of any of paragraphs A-A8, wherein the tension mechanism includes at least one strap extending between the foot-actuated-input-device support portion and another portion of the frame.

A10 The gaming chair of any of paragraphs A-A9, wherein the hand-actuated-input-device support portion is configured to support a hand-actuated input device at an angle of between about 20 and about 40 degrees relative to a horizontal plane that is parallel to a ground surface when the gaming chair is positioned for use.

A11 The gaming chair of any of paragraphs A-A9, wherein the hand-actuated-input-device support portion is configured to support a hand-actuated input device at an angle of about 30 degrees relative to a horizontal plane that is parallel to a ground surface when the gaming chair is positioned for use.

A12 The gaming chair of any of paragraphs A-A11, wherein the frame includes an upper surface that at least partially defines the hand-actuated-input-device support portion.

A12.1 The gaming chair of paragraph A12, wherein the upper surface is between about 20 and about 40 degrees relative to a horizontal plane that is parallel to a ground surface when the gaming chair is positioned for use.

A12.2 The gaming chair of paragraph A12, wherein the upper surface is about 30 degrees relative to a horizontal plane that is parallel to a ground surface when the gaming chair is positioned for use.

A12.3 The gaming chair of any of paragraphs A12-A12.2, wherein the upper surface is configured to receive suction cups associated with a hand-actuated input device for securing the hand-actuated input device to the frame.

A13 The gaming chair of any of paragraphs A-A12.3, wherein the frame is configured to receive clamps associated with a hand-actuated input device for securing the hand-actuated input device to the frame.

A14 The gaming chair of any of paragraphs A-A13,
 wherein the frame further includes a forward frame section, a rear frame section, and a foot-actuated-input-device support section;
 wherein the foot-actuated-input-device support section is operatively coupled to the forward frame section and defines the foot-actuated-input-device support portion; and
 wherein the forward frame section is operatively coupled to the rear frame section, and wherein the forward frame section and the rear frame section are configured so that the hand-actuated-input-device support portion is positioned to support a hand-actuated input device in a position to receive inputs from a user's hand when the user is seated on the seat.

A14.1 The gaming chair of paragraph A14, wherein foot-actuated-input-device support section engages a ground surface when the gaming chair is positioned for use.

A14.1.1 The gaming chair of paragraph A14.1, wherein the forward frame section does not engage the ground surface when the gaming chair is positioned for use.

A14.2 The gaming chair of paragraph A14, wherein the frame further includes an upper frame section operatively coupled to the forward frame section and the rear frame section, wherein the upper frame section defines the hand-actuated-input-device support portion.

A14.2.1 The gaming chair of paragraph A14.2, wherein the rear frame section includes a left leg extending from an underside of the upper frame section and a right leg extending from the underside of the upper frame section.

A14.2.2 The gaming chair of any of paragraphs A14.2-A14.2.1, wherein the forward frame section is pivotally coupled to the upper frame section.

A14.2.3 The gaming chair of any of paragraphs A14.2-A14.2.2, wherein the rear frame section is pivotally coupled to the upper frame section.

A14.2.4 The gaming chair of any of paragraphs A14.2-A14.2.2, wherein the rear frame section is not pivotally coupled to the upper frame section.

A14.3 The gaming chair of any of paragraphs A14-A14.2.4, wherein the forward frame section is configured to pivot relative to the rear frame section.

A14.4 The gaming chair of any of paragraphs A14-A14.3, wherein the foot-actuated-input-device support section is pivotally coupled to the forward frame section.

A14.5 The gaming chair of any of paragraphs A14-A14.4,
wherein the frame includes an extended configuration and a collapsed configuration;
wherein in the extended configuration, the forward frame section, the rear frame section, and the foot-actuated-input-device support section are angularly spaced apart relative to each other so that a foot-actuated input device supported by the foot-actuated-input-device support portion and a hand-actuated input device supported by the hand-actuated-input-device support portion are positioned to receive inputs from a user seated on the seat; and
wherein in the collapsed configuration, the forward frame section, the rear frame section, and the foot-actuated-input-device support section are angularly positioned adjacent to each other.

A14.6 The gaming chair of any of paragraphs A14-A14.5, wherein the tension mechanism includes:
at least one forward tension strap that extends between the foot-actuated-input-device support section and at least one of the forward frame section and the rear frame section; and
at least one rear tension strap that extends between the seat and at least one of the forward frame section and the rear frame section.

A14.6.1 The gaming chair of paragraph A14.6, wherein the at least one forward tension strap and/or the at least one rear tension strap is adjustable in length.

A14.6.2 The gaming chair of any of paragraphs A14.6-A14.6.1, wherein the tension mechanism includes two forward tension straps that extend between the foot-actuated-input-device support section and at least one of the forward frame section and the rear frame section.

A14.6.3 The gaming chair of any of paragraphs A14.6-A14.6.2, wherein the tension mechanism includes two rear tension straps that extend between the seat and at least one of the forward frame section and the rear frame section.

A14.7 The gaming chair of any of paragraphs A14.2-A14.5, wherein the tension mechanism includes:
at least one forward tension strap that extends between the foot-actuated-input-device support section and at least one of the forward frame section, the rear frame section, and the upper frame section; and
at least one rear tension strap that extends between the seat and at least one of the forward frame section, the rear frame section, and the upper frame section.

A14.7.1 The gaming chair of paragraph A14.7, wherein the at least one forward tension strap and/or the at least one rear tension strap is adjustable in length.

A14.7.2 The gaming chair of any of paragraphs A14.7-A14.7.1, wherein the tension mechanism includes two forward tension straps that extend between the foot-actuated-input-device support section and at least one of the forward frame section, the rear frame section, and the upper frame section.

A14.7.3 The gaming chair of any of paragraphs A14.7-A14.7.2, wherein the tension mechanism includes two rear tension straps that extend between the seat and at least one of the forward frame section, the rear frame section, and the upper frame section.

A14.8 The gaming chair of any of paragraphs A14.6-A14.7.3, wherein the tension mechanism further includes at least a portion of at least one of the forward frame section, the rear frame member, and the upper frame section.

A14.9 The gaming chair of any of paragraphs A14-A14.8, wherein the forward frame section includes a foot support member configured to support a user's foot in a position for operating a foot-actuated input device supported by the foot-actuated-input-device support portion.

A14.9.1 The gaming chair of paragraph A14.9, wherein the foot support member is configured to support a user's foot in a position above a ground surface when the gaming chair is positioned for use.

A14.9.2 The gaming chair of any of paragraphs A14.9-A14.9.1, wherein the forward frame section includes a left leg and a right leg, and wherein the foot support member includes a strap that extends between the left leg and the right leg.

A15 The gaming chair of any of paragraphs A-A14.8, wherein the frame further includes a foot support member configured to support a user's foot in a position for operating a foot-actuated input device supported by the foot-actuated-input-device support portion.

A15.1 The gaming chair of paragraph A15, wherein the foot support member is configured to support a user's foot in a position above a ground surface when the gaming chair is positioned for use.

A16 The gaming chair of any of paragraphs A-A15.1, wherein the frame is releasably coupled to the seat.

A17 The gaming chair of any of paragraphs A-A16, wherein the frame is further configured to support one or more accessories in a position accessible to a user's hand when the user is seated on the seat.

A18 The gaming chair of any of paragraphs A-A17, wherein the base portion of the seat is hingedly connected to the back portion of the seat.

A19 The gaming chair of any of paragraphs A-A18, in combination with a hand-actuated input device.

A20 The gaming chair of any of paragraphs A-A19, in combination with a foot-actuated input device.

A21 The gaming chair of any of paragraphs A-A20, wherein an angle of the hand-actuated-input-device support portion relative to a horizontal plane that is parallel to a ground surface is selectively adjustable when the gaming chair is positioned for use.

B A gaming chair, comprising:
a seat sized to receive a user;
a frame coupled to the seat and including:
a hand-actuated-input-device support portion configured to support a hand-actuated input device in a position to receive inputs from a user's hand when the user is seated on the seat; and
a foot-actuated-input-device support portion configured to support a foot-actuated input device in a position to receive inputs from a user's foot when the user is seated on the seat; and
a strap system operatively connecting the foot-actuated-input-device support portion to another portion of the frame and operatively connecting the seat to the frame, wherein the strap system includes at least one strap that is in tension when the gaming chair is in use.

B1 The gaming chair of paragraph B, wherein the strap system operatively connects the foot-actuated-input-device support portion to the seat so that the at least one strap is in tension when a user is seated on the seat, applies pressure with a foot against a foot-actuated input device supported by the foot-actuated-input-device support portion, and leans back in the seat.

B2 The gaming chair of any of paragraphs B-B1, wherein the strap system includes a plurality of straps that are in tension when the gaming chair is in use.

B3 The gaming chair of any of paragraphs B-B2, wherein the strap system includes at least one strap extending between the seat and the frame.

B4 The gaming chair of any of paragraphs B-B3, wherein the strap system includes at least one strap extending between the foot-actuated-input-device support portion and another portion of the frame.

B5 The gaming chair of any of paragraphs B-B4, wherein the hand-actuated-input-device support portion is configured to support a hand-actuated input device at an angle of between about 20 and about 40 degrees relative to a horizontal plane that is parallel to a ground surface when the gaming chair is positioned for use.

B6 The gaming chair of any of paragraphs B-B4, wherein the hand-actuated-input-device support portion is configured to support a hand-actuated input device at an angle of about 30 degrees relative to a horizontal plane that is parallel to a ground surface when the gaming chair is positioned for use.

B7 The gaming chair of any of paragraphs B-B6, wherein the frame includes an upper surface that at least partially defines the hand-actuated-input-device support portion.

B7.1 The gaming chair of paragraph B7, wherein the upper surface is between about 20 and about 40 degrees relative to a horizontal plane that is parallel to a ground surface when the gaming chair is positioned for use.

B7.2 The gaming chair of paragraph B7, wherein the upper surface is about 30 degrees relative to a horizontal plane that is parallel to a ground surface when the gaming chair is positioned for use.

B7.3 The gaming chair of any of paragraphs B7-B7.2, wherein the upper surface is configured to receive suction cups associated with a hand-actuated input device for securing the hand-actuated input device to the frame.

B8 The gaming chair of any of paragraphs B-B7.3, wherein the frame is configured to receive clamps associated with a hand-actuated input device for securing the hand-actuated input device to the frame.

B9 The gaming chair of any of paragraphs B-B8,
wherein the frame further includes a forward frame section, a rear frame section, and a foot-actuated-input-device support section;
wherein the foot-actuated-input-device support section is operatively coupled to the forward frame section and defines the foot-actuated-input-device support portion; and
wherein the forward frame section is operatively coupled to the rear frame section, and wherein the forward frame section and the rear frame section are configured so that the hand-actuated-input-device support portion is positioned to support a hand-actuated input device in a position to receive inputs from a user's hand when the user is seated on the seat.

B9.1 The gaming chair of paragraph B9, wherein the foot-actuated-input-device support section engages a ground surface when the gaming chair is positioned for use.

B9.1.1 The gaming chair of paragraph B9.1, wherein the forward frame section does not engage the ground surface when the gaming chair is positioned for use.

B9.2 The gaming chair of paragraph B9, wherein the frame further includes an upper frame section operatively coupled to the forward frame section and the rear frame section, wherein the upper frame section defines the hand-actuated-input-device support portion.

B9.2.1 The gaming chair of paragraph B9.2, wherein the rear frame section includes a left leg extending from an underside of the upper frame section and a right leg extending from the underside of the upper frame section.

B9.2.2 The gaming chair of any of paragraphs B9.2-B9.2.1, wherein the forward frame section is pivotally coupled to the upper frame section.

B9.2.3 The gaming chair of any of paragraphs B9.2-B9.2.2, wherein the rear frame section is pivotally coupled to the upper frame section.

B9.2.4 The gaming chair of any of paragraphs B9.2-B9.2.2, wherein the rear frame section is not pivotally coupled to the upper frame section.

B9.3 The gaming chair of any of paragraphs B9-B9.2.4, wherein the forward frame section is configured to pivot relative to the rear frame section.

B9.4 The gaming chair of any of paragraphs B9-B9.3, wherein the foot-actuated-input-device support section is pivotally coupled to the forward frame section.

B9.5 The gaming chair of any of paragraphs B9-B9.4,
wherein the frame includes an extended configuration and a collapsed configuration;
wherein in the extended configuration, the forward frame section, the rear frame section, and the foot-actuated-input-device support section are angularly spaced apart relative to each other so that a foot-actuated input device supported by the foot-actuated-input-device support portion and a hand-actuated input device supported by the hand-actuated-input-device support portion are positioned to receive inputs from a user seated on the seat; and
wherein in the collapsed configuration, the forward frame section, the rear frame section, and the foot-actuated-input-device support section are angularly positioned adjacent to each other.

B9.6 The gaming chair of any of paragraphs B9-B9.5, wherein the strap system includes:
at least one forward strap that extends between the foot-actuated-input-device support section and at least one of the forward frame section and the rear frame section; and
at least one rear strap that extends between the seat and at least one of the forward frame section and the rear frame section.

B9.6.1 The gaming chair of paragraph B9.6, wherein the at least one forward strap and/or the at least one rear strap is adjustable in length.

B9.6.2 The gaming chair of any of paragraphs B9.6-B9.6.1, wherein the strap system includes two forward straps that extend between the foot-actuated-input-device support section and at least one of the forward frame section and the rear frame section.

B9.6.3 The gaming chair of any of paragraphs B9.6-B9.6.2, wherein the strap system includes two rear straps that extend between the seat and at least one of the forward frame section and the rear frame section.

B9.7 The gaming chair of any of paragraphs B9.2-B9.5, wherein the strap system includes:
at least one forward strap that extends between the foot-actuated-input-device support section and at least one of the forward frame section, the rear frame section, and the upper frame section; and
at least one rear strap that extends between the seat and at least one of the forward frame section, the rear frame section, and the upper frame section.

B9.7.1 The gaming chair of paragraph B9.7, wherein the at least one forward strap and/or the at least one rear strap is adjustable in length.

B9.7.2 The gaming chair of any of paragraphs B9.7-B9.7.1, wherein the strap system includes two forward straps that extend between the foot-actuated-input-device support section and at least one of the forward frame section, the rear frame section, and the upper frame section.

B9.7.3 The gaming chair of any of paragraphs B9.7-B9.7.2, wherein the strap system includes two rear straps that extend between the seat and at least one of the forward frame section, the rear frame section, and the upper frame section.

B9.8 The gaming chair of any of paragraphs B9.6-B9.7.3, wherein the strap system further includes at least a portion of at least one of the forward frame section, the rear frame section, and the upper frame section.

B9.9 The gaming chair of any of paragraphs B9-B9.8, wherein the forward frame section includes a foot support member configured to support a user's foot in a position for operating a foot-actuated input device supported by the foot-actuated-input-device support portion.

B9.9.1 The gaming chair of paragraph B9.9, wherein the foot support member is configured to support a user's foot in a position above a ground surface when the gaming chair is positioned for use.

B9.9.2 The gaming chair of any of paragraphs B9.9-B9.9.1, wherein the forward frame section includes a left leg and a right leg, and wherein the foot support member includes a strap that extends between the left leg and the right leg.

B10 The gaming chair of any of paragraphs B-B9.8, wherein the frame further includes a foot support member configured to support a user's foot in a position for operating a foot-actuated input device supported by the foot-actuated-input-device support portion.

B10.1 The gaming chair of paragraph B10, wherein the foot support member is configured to support a user's foot in a position above a ground surface when the gaming chair is positioned for use.

B11 The gaming chair of any of paragraphs B-B10.1, wherein the frame is releasably coupled to the seat.

B12 The gaming chair of any of paragraphs B-B11, wherein the frame is further configured to support one or more accessories in a position accessible to a user's hand when the user is seated on the seat.

B13 The gaming chair of any of paragraphs B-B12, in combination with a hand-actuated input device.

B14 The gaming chair of any of paragraphs B-B13, in combination with a foot-actuated input device.

B15 The gaming chair of any of paragraphs B-B14, wherein an angle of the foot-actuated-input-device support portion relative to a ground surface is selectively adjustable when the gaming chair is positioned for use.

C. A gaming chair, comprising:
a seat sized to receive a user;
a frame coupled to the seat and including:
a foot-actuated-input-device support section configured to support a foot-actuated input device in a position to receive inputs from a user's foot when the user is seated on the seat;
a forward frame section coupled to the foot-actuated-input device support section;
an upper frame section coupled to the forward frame section and configured to support a hand-actuated input device in a position to receive inputs from a user's hand when the user is seated on the seat; and
a rear frame section coupled to the upper frame section; and
a strap system operatively connecting the foot-actuated-input-device support section to the seat, wherein the strap system includes at least one strap that is in tension when the gaming chair is in use and a user applies pressure with a foot against a foot-actuated input device supported by the foot-actuated-input-device support section and leans back in the seat.

C1 The gaming chair of paragraph C, in combination with a hand-actuated input device.

C2 The gaming chair of any of paragraphs C-C1, in combination with a foot-actuated input device.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

INDUSTRIAL APPLICABILITY

The gaming chairs of the present disclosure are applicable to the video game and video game furniture industries.

The invention claimed is:

1. A gaming chair, comprising:
a seat sized to receive a user and including a base portion and a back portion;
a frame coupled to the seat and including:
a hand-actuated-input-device support portion configured to support a hand-actuated input device in a position to receive inputs from a user's hand when the user is seated on the seat; and
a foot-actuated-input-device support portion configured to support a foot-actuated input device in a position to receive inputs from a user's foot when the user is seated on the seat; and
a tension mechanism operatively connecting the foot-actuated-input-device support portion to the seat so that the tension mechanism is in tension between the foot-actuated-input-device support portion and the seat when a user applies pressure with a foot against a foot-actuated input device supported by the foot-actuated-input-device support portion and applies pressure against the back portion of the seat with the user's back, wherein the tension mechanism extends from the foot-actuated-input-device support portion toward the hand-actuated-input-device support portion and from the seat toward the hand-actuated-input-device support portion.

2. The gaming chair of claim 1, wherein the tension mechanism includes at least one strap.

3. The gaming chair of claim 1, wherein the tension mechanism includes at least one strap extending between the seat and the frame.

4. The gaming chair of claim 1, wherein the tension mechanism includes at least one strap extending between the foot-actuated-input-device support portion and another portion of the frame.

5. The gaming chair of claim 1, wherein the hand-actuated-input-device support portion is configured to support a hand-actuated input device at an angle of between about 20 and about 40 degrees relative to a horizontal plane that is parallel to a ground surface when the gaming chair is positioned for use.

6. The gaming chair of claim 1, wherein an angle of the hand-actuated-input-device support portion relative to a horizontal plane that is parallel to a ground surface is selectively adjustable when the gaming chair is positioned for use.

7. The gaming chair of claim 1, wherein the frame includes an upper surface that at least partially defines the hand-actuated-input-device support portion, wherein the upper surface is configured to receive suction cups associated with a hand-actuated input device, and wherein the upper surface is between about 20 and about 40 degrees relative to a horizontal plane that is parallel to a ground surface when the gaming chair is positioned for use.

8. The gaming chair of claim 1,
wherein the frame further includes a forward frame section, a rear frame section, and a foot-actuated-input-device support section;
wherein the foot-actuated-input-device support section is operatively coupled to the forward frame section and defines the foot-actuated-input-device support portion; and
wherein the forward frame section is operatively coupled to the rear frame section, and wherein the forward frame section and the rear frame section are configured so that the hand-actuated-input-device support portion is positioned to support a hand-actuated input device in a position to receive inputs from a user's hand when the user is seated on the seat.

9. The gaming chair of claim 8, wherein the frame further includes an upper frame section operatively coupled to the forward frame section and the rear frame section, wherein the upper frame section defines the hand-actuated-input-device support portion.

10. The gaming chair of claim 9, wherein the rear frame section includes a left leg extending from an underside of the upper frame section and a right leg extending from the underside of the upper frame section.

11. The gaming chair of claim 9, wherein the forward frame section is pivotally coupled to the upper frame section.

12. The gaming chair of claim 9, wherein the rear frame section is pivotally coupled to the upper frame section.

13. The gaming chair of claim 9, wherein the rear frame section is not pivotally coupled to the upper frame section.

14. The gaming chair of claim 9, wherein the tension mechanism includes:
a forward tension strap that extends between the foot-actuated-input-device support section and at least one of the forward frame section, the rear frame section, and the upper frame section; and
a rear tension strap that extends between the seat and at least one of the forward frame section, the rear frame section, and the upper frame section.

15. The gaming chair of claim 14, wherein the tension mechanism further includes at least a portion of at least one of the forward frame section, the rear frame section, and the upper frame section.

16. The gaming chair of claim 8, wherein the forward frame section is configured to pivot relative to the rear frame section.

17. The gaming chair of claim 8, wherein the foot-actuated-input-device support section is pivotally coupled to the forward frame section.

18. The gaming chair of claim 8,
wherein the frame includes an extended configuration and a collapsed configuration;
wherein in the extended configuration, the forward frame section, the rear frame section, and the foot-actuated-input-device support section are angularly spaced apart relative to each other so that a foot-actuated input device supported by the foot-actuated-input-device support portion and a hand-actuated input device supported by the hand-actuated-input-device support portion are positioned to receive inputs from a user seated on the seat; and
wherein in the collapsed configuration, the forward frame section, the rear frame section, and the foot-actuated-input-device support section are angularly positioned adjacent to each other.

19. The gaming chair of claim 1, wherein the frame further includes a heel support member configured to support a user's feet in a position for operating a foot-actuated input device supported by the foot-actuated-input-device support portion.

20. The gaming chair of claim 19, wherein the heel support member is configured to support a user's feet in a position above a ground surface when the gaming chair is positioned for use.

21. The gaming chair of claim 1, in combination with a hand-actuated input device and a foot-actuated input device.

22. A gaming chair, comprising:
a seat sized to receive a user;
a frame coupled to the seat and including:
a hand-actuated-input-device support portion configured to support a hand-actuated input device in a position to receive inputs from a user's hand when the user is seated on the seat; and
a foot-actuated-input-device support portion configured to support a foot-actuated input device in a position to receive inputs from a user's foot when the user is seated on the seat; and
a strap system operatively connecting the foot-actuated-input-device support portion to the seat, wherein the strap system includes at least one strap that is in tension when the gaming chair is in use, and wherein the strap system extends from the foot-actuated-input-device support portion toward the upper frame section and from the seat toward the upper frame section.

23. A gaming chair, comprising:
a seat sized to receive a user;
a frame coupled to the seat and including:
a foot-actuated-input-device support section configured to support a foot-actuated input device in a position to receive inputs from a user's foot when the user is seated on the seat;
a forward frame section coupled to the foot-actuated-input device support section;
an upper frame section coupled to the forward frame section and configured to support a hand-actuated input device in a position to receive inputs from a user's hand when the user is seated on the seat; and a rear frame section coupled to the upper frame section; and a strap system operatively connecting the foot-actuated-input-device support section to the seat, wherein the strap system includes at least one strap that is in tension when the gaming chair is in use and a user applies pressure with a foot against a foot-actuated input device supported by the foot-actuated-input-device support section and leans back in the seat, and wherein the strap system extends from the foot-actuated-input-device support section toward the upper frame section and from the seat toward the upper frame section.

* * * * *